United States Patent

[11] 3,540,434

| [72] | Inventor | Allan H. Frey, Glenside, Pennsylvania |
| [21] | Appl. No. | 781,490 |
| [22] | Filed | Dec. 5, 1968 |
| [45] | Patented | Nov. 17, 1970 |
| [73] | Assignee | By mesne assignments to the United States of America as represented by the Secretary of the Navy. |

[54] COAXIAL ELECTRODE RECORDING SYSTEM
4 Claims, 2 Drawing Figs.

[52] U.S. Cl. .................................................. 128/2.1, 174/151
[51] Int. Cl. .................................................. A61b 5/04
[50] Field of Search .................................................. 128/2.1, 2.06, 419P, 407, 410; 174/151, 75.2

[56] References Cited
UNITED STATES PATENTS

| 3,060,923 | 10/1962 | Reiner | 128/2.1 |
| 3,089,483 | 5/1963 | Sheatz | 128/2.1 |
| 3,238,494 | 3/1966 | Bentley | 174/75X |
| 3,259,124 | 7/1966 | Hillier et al. | 128/2.1 |

Primary Examiner—Richard A. Gaudet
Assistant Examiner—Kyle L. Howell
Attorney—R. I. Tompkins, L. I. Shrago and C. E. Vautrain, Jr.

ABSTRACT: A coaxial pathway for transmitting and recording potentials evoked in an animal's brain while the animal is illuminated with pulse-modulated UHF energy. A coaxial connector having a probe-receiving cavity filled with solder surrounds a sleeve which supports an electrode probe extending from one end of said connector to a distal point beyond the opposite end of said connector. The probe is coated with an electrical insulating material.

Patented Nov. 17, 1970

3,540,434

INVENTOR.
ALLAN H. FREY

COAXIAL ELECTRODE RECORDING SYSTEM

The invention described herein may be manufactured and used by or for the Government of the United States of America for governmental purposes without the payment of any royalties thereon or therefor.

This invention concerns coaxial electrodes and, more particularly, a coaxial electrode for shielding very low potentials in a field of pulse-modulated UHF energy.

In biomedical research, one of the prime sources of data is electrophysiological recording. Such recording often must be done in areas where RF interference is prevalent to such an extent as to appreciably affect recorded information relating to biological, physiological and other preparations or experiments. Existing equipment has not been effective in reducing or eliminating undesired interference due to spurious or intentionally transmitted electromagnetic radiation, presenting a void which is disposed of by the system of the present invention.

Accordingly, it is an object of this invention to provide a coaxial pathway for the transmission of signals of very low potential through a field of pulse-modulated UHF energy.

Another object of this invention is to provide a coaxial electrode capable of reducing or substantially eliminating induced currents due to an electrically noisy environment.

Other objects, advantages and novel features of the invention will become apparent from the following detailed description thereof when considered in conjunction with the accompanying drawings in which like numerals represent like parts throughout and wherein.

Figures 1, 2:
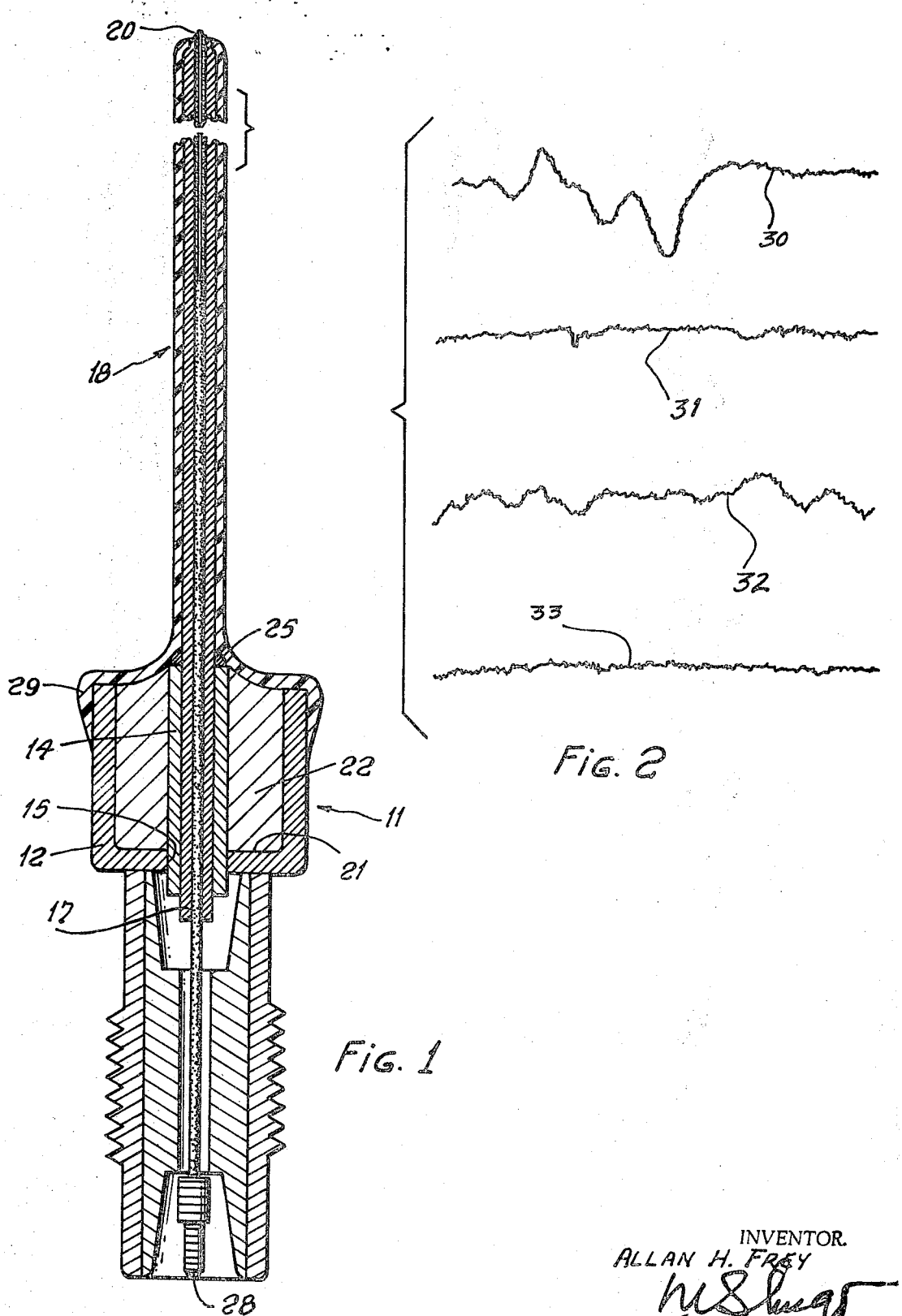
FIG. 1 is a sectional view of the electrode of the present invention.
FIG. 2 is a graph showing the improved responses obtained through the present invention.

Referring to FIG. 1, an electrode 11 is shown in cross section and includes as principal components a conventional form of coaxial connector 12, a sleeve 14 of conductive material which is inserted through an opening 15 in said connector, a tubing shield 17 of conductive material which is inserted through the sleeve forming a probe 18 and a coated central electrode 20 which traverses the passage in shield 17.

Electrode 11 is made preferably by first inserting sleeve 14 through opening 15 in connector 12 and, thereafter, filling the cavity 21 of the connector with appropriate solder. Sleeve 14 provides a rigid mount within the connector for tubing shield 17 which acts as a shield for the center conductor 20. Where miniature components are involved, the sleeve preferably is mounted in a micromanipulator; and the connector is mounted on a second micromanipulator, the micromanipulators then being positioned so that the sleeve can be forced through opening 15 the desired distance. A flux is caused to flow down around sleeve 14 inside the connector cavity and then the cavity is filled with solder 22 substantially to the top of the lip of connector 12. Sleeve material projecting above the solder is then cut off. The cavity 21 is of a size to contain a volume of solder on the order of from 6 to 10 times the volume of said sleeve disposed within the limits of said cavity to provide for dissipation of the electromagnetic energy intercepted by said probe means.

The next step in assembling the electrode includes inserting an appropriate length of tubing into the sleeve such that the tubing will extend substantially to the end of the sleeve, but not significantly beyond, since it may short-circuit the electrode. Flux is applied at the exposed junction 25 of the sleeve and shield and solder then is touched to this junction to affix the shield to the sleeve. Care must be taken not to use an excessive amount of solder or heat since the occurrence of either of these conditions may soften the solder in the cavity and cause movement of sleeve 14. Shield 17 is then cut off at the end opposite the upper end of cavity 21 at the length desired for the electrode. A chamfer is ground around the outside end of the shield and all burrs are removed from the inside as well as from the outside edge of the shield. The interior passage of shield 17 is thoroughly rinsed with acetone at this time to remove deposits of solder flux. A hypodermic syringe may be employed for this purpose. At this stage, the electrode is ready to receive the coated center conductor 20 whose preparation may be as follows.

A selected length of wire of desired noncorrosiveness such as stainless steel wire is cut and straightened and a pin 28, preferably of gold, is secured to one end of the conductor wire. Where the center conductor is made of stainless steel, the end to which pin 28 is to be affixed is tinned with stainless steel solder and then inserted into a hole in the bottom of the pin by hand. Flux is then applied, the assembly heated and a very small amount of solder, such as may be deposited by a mere touch of a solder tool, is applied at the junction. The flux is then removed with acetone. The center conductor is now insulated with a suitable insulating material such as Formvar or other thermoplastic resin up to and contacting the blunt end of the pin. Coating the center conductor is critical and, therefore, care must be taken that the center conductor be fully immersed and, thereafter, withdrawn from the bath of insulating material very slowly so as to insure a uniform coat on the center conductor. A rate of withdrawing of one-quarter millimeter per second has been found satisfactory although such a rate will vary with differences in viscosity of the material. At this time, the coated center conductor is placed pin down into an oven at a temperature of $400° \pm 10°F$. and baked for substantially 10 minutes. The coated wire is then coated a second time and rebaked at the same temperature for substantially the same time.

Finally, electrode assembly is begun by injecting the insulating material into tubing shield 17. Care must be exercised to completely fill the inside of the tubing shield. The pin assembly is then given a third coat of the insulating material; and while this coating and that inside of tubing shield 17 still are in the viscous form, the center conductor is inserted gently by hand into the tubing shield. No substantial resistance should be encountered during insertion of the coated center conductor. However, if resistance is encountered, it may be caused by a burr and indicates that the conductor should be checked and the burr or other impediment removed. After pin 28 sets in the connector, the electrode is suspended down in a fixture and placed in an oven and baked for 7 minutes $\pm 20$ seconds at a temperature of $380° \pm 5°F$. This temperature is critical since a temperature exceeding that specified may result in a softening of the solder in the connector cavity while a temperature less than that described may be too low to cause the Formvar or other material to harden properly. The entire assembly may now be coated externally as shown at 29 with Formvar in a manner similar to that described for the pin and wire assembly and baking may then be accomplished as described in relation to the pin and wire assembly.

The remainder of the pathway from the connector electrode to a preamplifier is formed of a coaxial cable of a standard manufacture and, therefore, will not be described herein. In use, one connector is mated to the electrode and another is attached to the emitter follower of the amplifier through a subminiature adaptor if necessary.

The coaxial recording pathway established by the device described may now be used to form a pathway through a field of electromagnetic energy which pathway is shielded so that the minute signals evoked in a test animal, such as in the brain stem of a cat, are protected from noise.

FIG. 2 illustrates an example of the effectiveness of the foregoing method and means and compares in traces 30 and 31, taken before and after death, respectively, the data from a cat which had the electrode tip implanted in the nucleus subthalamicus area. Traces 32 and 33, also taken before and after death, respectively, are from a cat which had an electrode implanted in the formatio reticularis. The head of each cat was illuminated with pulse-modulated UHF energy during each of the traces shown in FIG. 2. A review of traces 31 and 33 indicates an absence of response to radiated energy in traces after death despite the fact that the recording pathway was immersed in UHF energy. Since no responses are evoked in a dead animal, the traces in FIG. 2 are representative of the effectiveness of the shielded coaxial electrode of the present invention.

The pathway herein provided minimizes the possibility of environmental energy inducing undesired currents in a recording system associated therewith which energy ordinarily would stimulate a subject undergoing test or drive the amplifiers in the recording system. Although the system has been described in relation to tests on animals, it will be appreciated that it is applicable to investigate work generally which is carried out in an electrically noisy environment.

I claim:

1. A coaxial electrode adapted for transmitting signals representing potentials evoked in living creatures by electromagnetic energy comprising:

a coaxial connector having a probe-receiving cavity at one end and coaxial cable connection means at the opposite end;

an electrically conductive sleeve traversing said cavity and soldered therein to form a supported passage electrically connected to the peripheral member of said coaxial connector;

electrically conductive shield means inserted in and attached to said sleeve;

said shield means terminating adjacent the face of said connector nearest said coaxial cable connection means at one end and extending a selected distance beyond said sleeve at the opposite end;

an electrically insulated central electrode traversing the interior of said shield means and adhered thereto;

said central electrode terminating at one end adjacent the end of said shield means remote from said coaxial connector and at the other end adjacent said coaxial cable connection means;

said shield and said connector coated with electrical insulating material from a position spaced a selected short distance from said central electrode at one end to a position extending substantially beyond the opening of said cavity at the opposite end; and an electrically conductive connector pin attached to the end of said central electrode adjacent said coaxial cable connection means and disposed so as to form a male connector.

2. The electrode of claim 1 wherein said sleeve and said conductive shield means are formed of stainless steel and said cavity is filled with stainless steel solder.

3. The electrode of claim 2 wherein said electrical insulation and said electrical insulating material are of thermoplastic resin.

4. The electrode of claim 3 wherein said cavity is of sufficient size to contain a volume of solder on the order of from 6 to 10 times the volume of said sleeve disposed within the limits of said cavity to provide for dissipation of the electromagnetic energy intercepted by said probe means.